E. L. Walker.
Horse Hay Fork.

Nº 54044. Patented Apr. 17, 1866.

Witnesses
H. H. Casebeer
Samuel Snyder

Inventor
Edwd L. Walker

UNITED STATES PATENT OFFICE.

EDWARD L. WALKER, OF BENFORD'S STORE, PENNSYLVANIA.

IMPROVEMENT IN HORSE HAY-FORKS.

Specification forming part of Letters Patent No. 54,044, dated April 17, 1866.

*To all whom it may concern:*

Be it known that I, EDWARD L. WALKER, of Benford's Store P. O., in the county of Somerset and State of Pennsylvania, have invented a new and Improved Hay-Elevator; and I do hereby declare that the following is a full, clear, and exact description thereof, which will enable others skilled in the art to make and use the same, reference being had to the accompanying drawings, forming a part of this specification.

Figure 1:
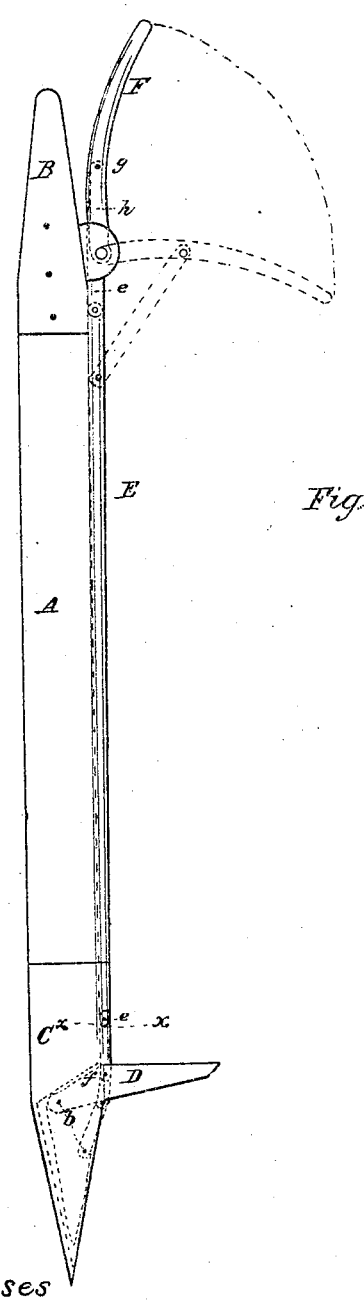
Figure 2:
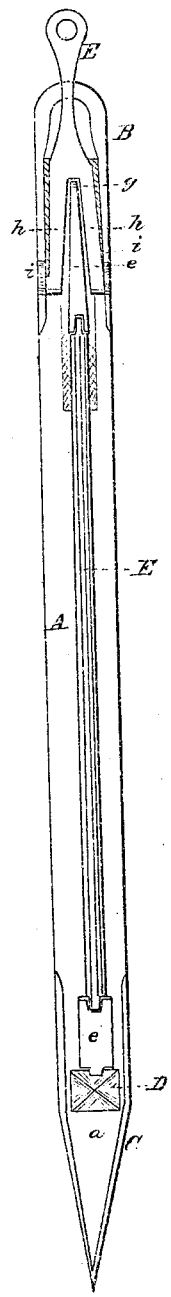
Figure 3:
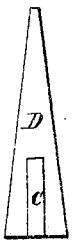

Figures 1 and 2 are external views of my invention. Fig. 3 is a horizontal section taken in the line $x$ $x$, Fig. 1.

Similar letters of reference indicate like parts.

This invention relates to a new and simple device for elevating hay in barns and discharging it in mows.

A represents a rod or shaft provided with a groove. This rod has an eye, B, secured to its upper end and a pointed head, C, bolted or otherwise secured to its lower end, so that it may enter and be forced into the hay very readily. This head C has a recess, $a$, made into it, into which there is fitted a finger or barb, D, which is placed loosely on a shaft, $b$, passing transversely through the head C. This finger is also provided with a recess or groove, as shown in Fig. 3.

Within the groove of rod A is fitted a sliding rod, E, provided with joints or links $e$ $e$ at either end, the lower end of which is placed loosely on a shaft, $f$, passing transversely through the finger D, and the upper end is fitted on a similar shaft, $g$, passing through the lever F and forming its fulcrum-pin.

The lever F has two arms, $h$ $h$, at its lower end, each of which is attached loosely by a journal to an arm, $i$ $i$ of rod A, so as to allow the upper end of rod E to pass the center of gravity created by pressure on finger D.

The hoisting-rope is attached to eye B of rod A.

In using the implement the operator presses down on the lever F, which presses the finger D into the recess $a$, so as to allow the pointed head C to enter the hay. The operator now presses the implement into the hay, which is facilitated by twisting back and forth. When it has entered so far as to press upward at the lever the operator should get on it with his foot, and with his whole weight press it in as far as it will go. By now drawing slightly upward at the cord used for discharging the load the rod E will be entirely straightened and will pass the center of gravity in the lever F, holding the finger D firmly in a horizontal position, as shown in Fig. 1. The load is now elevated to its proper place, when by the operator drawing the cord attached to the lever F he again draws the upper end of the rod E back past the center of gravity, allowing the finger D to drop into the recess $a$, and the load is discharged.

Having thus described my invention, I claim as new and desire to secure by Letters Patent—

The grooved rod A, head C, finger D, sliding rod E, and lever F, arranged substantially as and for the purpose specified.

EDWARD L. WALKER.

Witnesses:
  GABRIEL WALKER,
  SAMUEL SNYDER.